United States Patent [19]

Boydell

[11] 3,726,089
[45] Apr. 10, 1973

[54] FLUID-PRESSURE-OPERABLE SYSTEMS

[75] Inventor: Kenneth Raymond Boydell, Tewkesbury, England

[73] Assignee: Dowty Technical Development Limited, Brockhampton, Cheltenham, England

[22] Filed: Apr. 8, 1971

[21] Appl. No.: 132,480

[52] U.S. Cl. .....................60/422, 60/427, 60/450
[51] Int. Cl. ..............................................F15b 11/16
[58] Field of Search ..............60/52 VS, 52 S, 52 HE, 60/97 P

[56] References Cited

UNITED STATES PATENTS

| 2,892,311 | 6/1959 | Van Gerpen | 60/52 VS |
| 2,892,312 | 6/1959 | Allen et al. | 60/52 VS |
| 3,366,064 | 1/1968 | Stephens et al. | 60/52 VS |

Primary Examiner—Edgar W. Geoghegan
Attorney—Young & Thompson

[57] ABSTRACT

A fluid-pressure-operable system including a variable-delivery pump, a pressure-responsive element operable to vary pump displacement, and a selector valve for controlling supply of fluid from the pump to a service. The pressure to which the element is subjected is changed upon movement of the selector valve from a neutral position to a service-selecting position, whereby the pump is adjusted from a first displacement setting to another displacement setting.

13 Claims, 1 Drawing Figure

PATENTED APR 10 1973
3,726,089
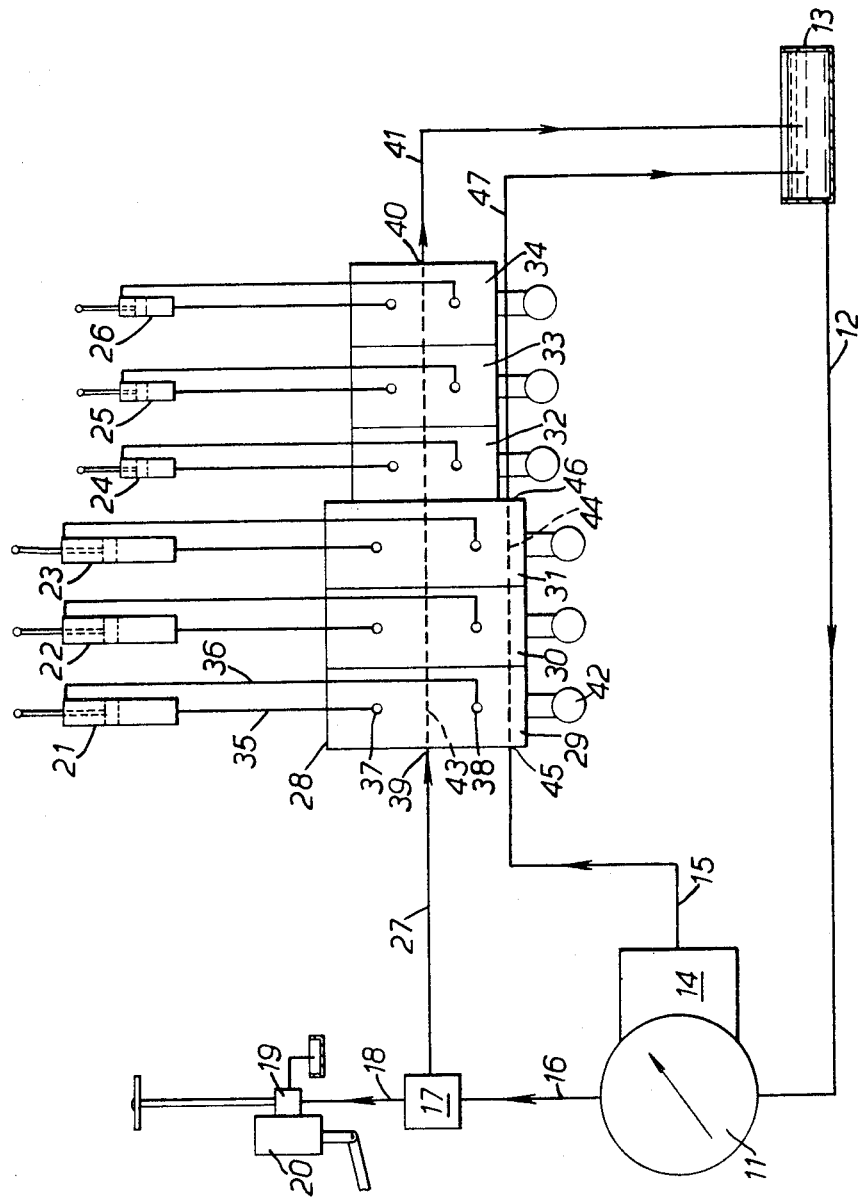
INVENTOR
KENNETH RAYMOND BOYDELL
BY
Young + Thompson
ATTORNEYS

FLUID-PRESSURE-OPERABLE SYSTEMS

This invention relates to fluid-pressure-operable systems.

According to this invention a fluid-pressure-operable system includes a variable-delivery pump, a pressure-responsive element operable to vary the displacement of the pump, a service, and a selector valve for controlling supply of fluid from the pump to the service, the pressure-responsive element being subjected, by positioning of the selector valve in its neutral position, to a first fluid pressure, whereby the pump is held in a first displacement setting, and being subjected, by movement of the selector valve to a service-supplying position, to a change in fluid pressure, whereby the pump is adjusted to another displacement setting.

Where a plurality of said selector valves is provided, certain thereof may be of one flow capacity and certain thereof of a lower flow capacity, the system being arranged so that when the selector valves of said one flow capacity are in their neutral positions, they provide a flow route whereby said pressure-responsive element maintains the pump in its said first displacement setting, affording adequate pressure fluid supply to said selector valves of lower flow capacity for operation of their associated services. When, however, a selector valve of said one flow capacity is moved to an operative position, the flow route is closed, automatically to cause adjustment of the pressure-responsive element to bring the pump to said other displacement setting affording adequate pressure fluid supply for all the selector valves and their associated services.

The pump may be of the adjustable swash-plate type.

The or each service may be an hydraulically-operable jack suitable, for example, for operating earth-moving implements on an earth-moving vehicle.

Means may be provided whereby said pump can also deliver its pressure fluid through a priority valve to a device separate from said services, and separately controlled, whereby that device has priority over said services in the supply to it of pressure fluid from said pump. The said device may for example be the jack of a power steering system suitable for an earth-moving vehicle.

The said flow route may be provided by ports in the displaceable elements and in the casing portions of the selector valves of said one flow capacity, which ports are brought into alignment when all of said displaceable elements of those selector valves are moved to their neutral positions, said flow route being from the pressure-responsive element to exhaust.

The pressure-responsive element may form part of a servo arrangement to govern the delivery conditions of the pump precisely to meet the demands of the controlled services substantially without overloading the pump-driving means.

One embodiment of the invention will now be particularly described by way of example with reference to the accompanying diagrammatic drawing.

Referring to the drawing, a variable-delivery pump 11 of the adjustable swash-plate type is connected to draw its liquid through a conduit 12 from a reservoir 13. The pump delivery- varying mechanism, indicated generally at 14 includes a servo arrangement similar to that disclosed in the specification of U.S. Pat. No. 3,667,867 but it is arranged that the swashplate of the pump cannot be reduced in angle as far as would give a zero pump displacement. Instead, the swash-plate can only reach a low angle at which the pump displacement is at a predetermined low flow value. This occurs when a pressure-responsive element forming part of the mechanism 14 is placed in communication with reservoir through a conduit 15.

The pump 11 delivers liquid under pressure through a conduit 16 to a priority valve 17 one outlet of which is connected by a conduit 18 to the control valve 19 of a power steering jack 20 for steering the wheels of an earth-moving vehicle. The fluid-pressure-operable system now being described is also intended to provide hydraulic power for the earth-moving implements upon that vehicle, and these are operable by services in the form of telescopic hydraulic jacks 21, 22, 23, 24, 25 and 26.

Although the pressure fluid supply through the conduit 18 is given priority by the priority valve 17, the pump is also capable of supplying liquid which passes from a second outlet of the priority valve through a conduit 27 to a bank of six selector valves 28 comprising separate sections 29, 30, 31, 32, 33 and 34, stacked together as shown.

The jacks 21 to 26 are of double-acting type and are connected by suitable service lines 35, 36 to service line ports 37 and 38 on each of the valve sections 29 to 34.

The valve bank 28 has a single inlet connection 39 to which the conduit 27 is connected and a single exhaust connection 40 at the opposite end of the bank which is connected through a conduit 41 with the reservoir 13.

The displaceable elements of the valve sections 29 to 34 are of spool type, controllable by individual operator's handles, as at 42. When all of the spools are in their neutral positions, an unloader or open-center passage, diagrammatically shown by the dotted line 43, is provided throughout the length of the bank whereby liquid under pressure delivered by the pump to the inlet connection 39 passes directly to the exhaust connection 40 and through the conduit 41 to reservoir.

When any one of the spools is moved away from its neutral position, the open-center passage 43 is blocked and pressure liquid is available at all the spools for direction by that one spool, or any other subsequently-selected spool or spools, to the appropriate side of the respective service 21, 22, 23, 24, 25 and 26.

The jacks 21, 22 and 23 are intended to operate booms, slews and the like on the vehicle and thus are larger in capacity than the jacks 24, 25 and 26 which are intended to operate stabilizers, shift locks and the like. Accordingly, the flow capacities of the valve sections 29, 30 and 31 are greater than the flow capacities of the valve sections 32, 33 and 34.

The valve sections 29, 30 and 31 have a subsidiary unloader passage provided across them which is indicated by the dotted line 44. When the spools of the valve sections 29, 30 and 31 are in their neutral positions this subsidiary unloader passage is open. The conduit 15 which is connected to a subsidiary inlet connection 45 at the section 29 is placed in communication with a subsidiary outlet connection 46 on the valve section 31. The connection 46 is placed in communication through a conduit 47 with the reservoir 13.

A selector valve incorporating such a subsidiary unloader passage is described in the specification of copending U.S. application Ser. No. 132,478, filed Apr. 8, 1971.

In operation of the fluid-pressure-operable system above described, when all of the spools of the selector valve sections 29 to 34 are in their neutral positions, the pressure-responsive element of the mechanism 14 is subjected to return pressure through conduit 15 and the pump is maintained at a predetermined low flow displacement setting. This low flow setting is adequate for the supply of liquid under pressure to the power steering jack 20, with priority afforded thereto by the priority valve 17, and is also adequate for the operation of the services 24, 25 and 26 which are controlled by the valve sections 32, 33 and 34 of lower flow capacity.

If, with the pump operating at this setting, nd the power steering jack 20 making little or no demands upon the pump supply, one of the jacks 24, 25 and 26 is required to be operated, the spool of its associated selector valve section 32, 33 or 34 is moved away from its neutral position to the appropriate selected position. Hence, the open-center passage 43 from the inlet connection 39 to the outlet connection 40 of the bank is closed and pressure fluid is available at the appropriate service line port 37 or 38 and passes through the service line 35 or 36 to that jack, the other side of the jack being exhausted to reservoir through the non-pressurized service line, through exhaust ducting within the control valve block, the exhaust connection 40 and the conduit 41.

The pump delivery-varying mechanism is maintained at this low predetermined flow setting because the conduit 15 is open to the reservoir 13 through the subsidiary unloader passage 44 across the three valve sections 29, 30 and 31, which passage, as explained above, is maintained open with the spools of these three sections in their neutral positions.

When, however, it is required to operate any one or more of the services 21, 22 or 23, the spool or spools of the appropriate valve sections 29, 30 and 31 are moved away from their neutral positions in the appropriate direction to a service-selecting position. Such movement immediately closes the subsidiary unloader passage 44, blocking communication from the delivery-varying mechanism 14 of the pump with the reservoir 13. Hence, the element of the mechanism 14 is now subjected to higher fluid pressure and thus increases the swash angle of the pump 11 to bring the pump to a different and higher displacement setting appropriate to the higher total flows which are necessary for operating the services 21, 22 and 23, either additionally to, or alternatively to, the services 24, 25 and 26.

Again, the priority valve 17 ensures that priority in flow of liquid under pressure is given to the power steering jack 20, but the pump 11 is now displacing sufficient liquid under pressure as to be capable of operating the booms, slews and the like associated with the jacks 21, 22 and 23 at their required operating rates. The constant power servo, which forms part of the delivery-varying mechanism 14, governs the flow delivery condition of the pump precisely to meet the power demands of the controlled services without overloading the engine which mechanically drives the pump 11.

As long as the subsidiary unloader passage 44 is maintained closed by selection of any one of the spools of the valve sections 29, 30 and 31 to either of its operative positions, the delivery of the pump 11 is automatically variable in accordance with the demands made upon it, but as soon as all three spools of the valve sections 29, 30 and 31 are returned to their neutral positions, the variable-delivery mechanism 14 of the pump 11 is again placed in communication with the reservoir 13, whereupon the pump is returned to the said predetermined low flow displacement setting in which the delivery of the pump is adequate only for power steering and operation of the services 24, 25 and 26.

With the arrangement of this fluid-pressure-operable system, at no time is the variable-delivery pump caused to operate at a condition below said predetermined displacement setting.

Although in the embodiment described above with reference to the drawing the fluid-pressure-operable system includes a priority valve for ensuring priority of flow to a power steering jack, in alternative embodiments of the invention no such device requiring priority of flow is provided, but nevertheless with all of the high flow capacity valves in their neutral positions it is ensured that the pump is maintained at a predetermined displacement setting affording a positive delivery flow which if not utilized by the services of lower flow capacity is by-passed to reservoir through the open-center passageway.

Again, although in the embodiment above described with reference to the drawing, the selector valve bank includes three large flow valve sections and three low flow valve sections, in other embodiments only one large flow and only one low flow valve section may be provided, or alternatively any higher number of large flow and low flow sections may be provided.

Further, the invention is in no way limited in its application to services forming part of an earth-moving vehicle, as in other embodiments of the invention it is with advantage applied in other installations where services of different capacities are required to be operated. The services need not be of double-acting type, but instead of single-acting type.

I claim

1. A fluid-pressure-operable system including a variable-delivery pump, a pressure-responsive element operable to vary the displacement of the pump, a service, a selector valve adapted to control the supply of fluid from the pump to the service, a reservoir, means in the casing and in the displaceable element of the selector valve which, when that element is in its neutral position, define a main unloader passage which places the delivery side of the pump in communication with the reservoir, and subsidiary means in the casing and in said displaceable element which, when that element is in its neutral position, define a subsidiary unloader passage which places said pressure-responsive element in communication with said reservoir whereby the pump is held in a first displacement setting, and said displaceable element being adapted for movement to a service-selecting position, whereby to be capable of closing, substantially simultaneously, the routes through said main unloader passage and said subsidiary unloader passage to reservoir, thereby respectively to enable pump delivery then to be directed by the displaceable element to said service, and to cause said pressure-responsive element to be subjected to a change of fluid pressure so that the pump is adjusted to another displacement setting.

2. A fluid pressure-operable system including a variable-delivery pump, a pressure-responsive element operable to vary the displacement of the pump, a service, a selector valve, having a main inlet connection, an exhaust connection, a subsidiary inlet connection, and at least one service-line port, said selector valve being adapted to control the supply of fluid from the pump to the service, a reservoir, a first conduit connected between the delivery side of the pump and said main inlet connection, a second conduit connected between said exhaust connection and the reservoir, a third conduit which is in communication with said pressure-responsive element and which is connected to said subsidiary inlet connection, main unloader means provided both in the casing and in the displaceable element of the selector valve, which means, when the displaceable element is in its neutral position, define a main unloader passage which places said main inlet connection and said exhaust connection in communication, through which passage pump delivery can pass to reservoir, and further unloader means provided both in the casing and in said displaceable element, which further unloader means, when said displaceable element is in its neutral position, define a subsidiary unloader passage by which said pressure-responsive element is placed in communication with reservoir and is thereby subjected to a first fluid pressure whereby said pump is held in a first displacement setting, and said displaceable element being movable away from its neutral position to a service-selecting position whereby said main unloader passage and said subsidiary unloader passage are both closed, substantially simultaneously, closure of said main unloader passage enabling pump delivery to be directed by said displaceable element through said service-line port to said service, and closure of said subsidiary unloader passage stopping flow from said third conduit to reservoir thereby to cause said pressure-responsive element to be subjected to a change of fluid pressure so that the pump is adjusted to another displacement setting.

3. A system as claimed in claim 2, wherein at least one further selector valve and an associated service are provided, all the selector valves being arranged in banked manner.

4. A system as claimed in claim 3, wherein the casing and the displaceable element of each further selector valve are provided with means whereby when both or all of the displaceable elements are in their neutral positions, those means respectively form part of said main unloader passage and part of said subsidiary unloader passage.

5. A system as claimed in claim 3, wherein at least one said further selector valve has means which, when all of the displaceable elements of the selector valves are in their neutral positions, form part of only said main unloader passage.

6. A system as claimed in claim 1, wherein the jack is double-acting.

7. A system as claimed in claim 2, wherein a subsidiary exhaust connection is provided in the casing of said selector valve and a fourth conduit connects the subsidiary exhaust connection to said reservoir.

8. A system as claimed in claim 2, wherein said first conduit includes a priority valve connected by a priority conduit to a device required to have priority of fluid pressure supplied by said pump over said service.

9. A system as claimed in claim 2, wherein the service is an hydraulically-operable jack.

10. A system as claimed in claim 8, wherein said device is the jack of a power steering system suitable for an earth-moving vehicle.

11. A fluid-pressure-operable system including a variable-delivery pump, a pressure-responsive element operable to vary the displacement of the pump, at least two services, at least two selector valves respectively associated with said services, said selector valves being arranged in banked manner and the bank having a main inlet connection, an exhaust connection, a subsidiary inlet connection, and at least one service-line port for each service, each selector valve being adapted to control the supply of fluid from the pump to its respective service, a reservoir, a first conduit connected between the delivery side of the pump and said main inlet connection, a second conduit connected between said exhaust connection and the reservoir, a third conduit which is in communication with said pressure-responsive element and which is connected to said subsidiary inlet connection, main unloader means provided both in the casing and in the displaceable element of each selector valve, which means when the displaceable elements of the selector valves are in their neutral positions define a main unloader passage across the bank which places said main inlet connection and said exhaust connection in communication, through which passage pump delivery can pass to reservoir, and further unloader means provided both in the casing and in the displaceable element of one of said selector valves, which further unloader means, when that displaceable element is in its neutral position, define a subsidiary unloader passage by which said pressure-responsive element is placed in communication with reservoir and thereby subjected to a first fluid pressure whereby said pump is held in a first displacement setting adequate for supply of pressure liquid to the other of said selector valves and its service, when the displaceable element of that selector valve is moved from its neutral position, and said displaceable element of said one selector valve being movable away from its neutral position to a service-selecting position whereby said main unloader passage and said subsidiary unloader passage are both closed, substantially simultaneously, closure of said main unloader passage enabling pump delivery to be directed by said displaceable elements through said service-line ports to said services and closure of said subsidiary unloader passage stopping flow from said third conduit to reservoir thereby to cause said pressure-responsive element to be subjected to a change of fluid pressure so that the pump is adjusted to another displacement setting adequate for supply of pressure fluid to both the one and the other of said selector valves and their services.

12. A system as claimed in claim 11, wherein said bank comprises further of said one selector valves arranged adjacent to each other and further of said other selector valves arranged adjacent to each other, said main unloader passage extending through all said one and all said other selector valves when their displaceable elements are in their neutral positions, and said subsidiary unloader passage extending through all of said one selector valves when the displaceable elements thereof are in their neutral positions.

13. A system as claimed in claim 11, wherein said one selector valve is of one flow capacity and said other selector valve is of another flow capacity.

* * * * *